(12) United States Patent
Hausschmid et al.

(10) Patent No.: US 6,829,557 B2
(45) Date of Patent: Dec. 7, 2004

(54) METHOD AND DEVICE FOR INCREMENTAL POSITION DETERMINATION

(75) Inventors: Mathias Hausschmid, Palling (DE); Robert Wastlhuber, Garching a.d. Alz (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 25 days.

(21) Appl. No.: 10/339,660

(22) Filed: Jan. 9, 2003

(65) Prior Publication Data
US 2003/0139829 A1 Jul. 24, 2003

(30) Foreign Application Priority Data
Jan. 10, 2002 (DE) .......................... 102 00 587

(51) Int. Cl.[7] .............................................. G01C 17/00
(52) U.S. Cl. ......................................... 702/150; 700/56
(58) Field of Search .............................. 702/150, 151, 702/56, 85

(56) References Cited

U.S. PATENT DOCUMENTS 5,216,626 A * 6/1993 Kranitzky ................... 702/151
6,009,189 A * 12/1999 Schaack ..................... 382/154
6,111,402 A * 8/2000 Fischer ................... 324/207.17
6,401,052 B1 * 6/2002 Herb et al. ................. 702/150
6,452,159 B2 * 9/2002 Holzapfel et al. ...... 250/231.13

FOREIGN PATENT DOCUMENTS

DE           44 43 898 C2       9/1996

* cited by examiner

*Primary Examiner*—Edward Raymond
(74) *Attorney, Agent, or Firm*—Brinks Hofer Gilson & Lione

(57) ABSTRACT

A method for the incremental position determination of two objects, which are movable in relation to each other. The method including generating at least one pair of position-dependent incremental scanning signals during a position determination between two objects, which have a defined phase offset from each other. Passing the at least one pair of position-dependent incremental scanning signals on to a transformation table in which one or several output signal values with respect to each pair of the at least one pair of position-dependent incremental scanning signals have been stored. Transferring the one or several output signals from the transformation table to an evaluation unit wherein position determination between the two objects is performed. Dynamically updating the transformation table during the position determination between the two objects.

29 Claims, 3 Drawing Sheets

METHOD AND DEVICE FOR INCREMENTAL POSITION DETERMINATION

Applicants claim, under 35 U.S.C. § 119, the benefit of priority of the filing date of Jan. 10, 2002 of a German patent application, copy attached, Ser. No. 102 00 587.7, filed on the aforementioned date, the entire contents of which is incorporated herein by reference.

BACKGROUND OF THE INVENTION

1. Field of the Invention

The present invention relates to a method for the incremental position determination of two objects which are movable in relation to each other. The present invention moreover relates to a device for executing the method.

2. Discussion of Related Art

Incremental position measuring systems for determining the position of objects which can be moved in relation to each other are known, which detect relative movements of the objects in relation to each other in defined measurement steps, or increments. The incremental position measuring systems used for this purpose have, for example, a scale with an incremental measuring graduation, which is connected with one of the two objects, as well as a scanning unit, which is connected with the other of the two objects. Customarily a pair of position-dependent incremental scanning signals, which have a defined phase offset with respect to each other, is generated by optical, magnetic, inductive or capacitive scanning. Alternatively to the above described position measuring systems with physically embodied scale graduations it is however also possible to generate such scanning signals with the aid of a laser interferometer. In this case the respective airwave length is used as the measuring standard.

In many application cases the most diverse transformation operations with respect to the generated scanning signals are required prior to the actual further processing of the scanning signals in a downstream-connected evaluation unit, for example a numerical machine tool control device.

The interpolation of the scanning signals can for example be performed as a transformation operation for increasing the resolution of such position measuring systems. This should be understood to be a further electronic division, or multiplication, of the delivered signal periods of the scanning signals. Expressed mathematically, in this case the interpolation is a coordinate transformation from Cartesian coordinates into polar coordinates.

A correction of the scanning signals with respect to possibly present amplitude and/or offset errors can be provided within the scope of a further transformation operation prior to actual further processing.

A method and a device for processing incremental scanning signals is proposed in the publication DE 44 43 898 C2, wherein various transformation operations are performed prior to further processing. Thus, besides an interpolation of the scanning signals, a further correction of the scanning signals is performed in accordance with the publication. A first transformation table in the form of an interpolation table to which the digital scanning signals are provided in pairs is used for interpolation. The digitized scanning signals are used for addressing the first transformation table, in which an output signal value in the form of a defined interpolation value is assigned to each pair of input signal values present. An interpolation value which corresponds to a fraction of a signal period of the scanning signals is applied to the output of the first transformation table. A second transformation table follows the first transformation table and is used for the correction of errors in the period start and period length. Additional errors in the scanning signals, such as amplitude errors and offset errors, are corrected in a third transformation table, which is placed ahead of the first transformation table.

In connection with the above described device, or the above described method it should be noted that neither the device nor the method provides the possibility of providing flexible correction of errors in the scanning signals, which change or vary in the course of the actual position measurement. If, for example, a transformation table were to be provided for this, in which the correct output signal values of all conceivable input signal values would be stored, a very large transformation table with a correspondingly large need for memory would be required for this.

OBJECT AND SUMMARY OF THE INVENTION

It is therefore an object of the present invention to disclose a method and a device for incremental position determination, by which a flexible transformation of the generated scanning signals is assured without a large outlay for computing and memory.

This object is attained by a method for the incremental position determination of two objects, which are movable in relation to each other. The method including generating at least one pair of position-dependent incremental scanning signals during a position determination between two objects, which have a defined phase offset from each other. Passing the at least one pair of position-dependent incremental scanning signals on to a transformation table in which one or several output signal values with respect to each pair of the at least one pair of position-dependent incremental scanning signals have been stored. Transferring the one or several output signals from the transformation table to an evaluation unit wherein position determination between the two objects is performed. Dynamically updating the transformation table during the position determination between the two objects.

The stated object is furthermore attained by a device for the incremental position determination of two objects, which are movable in relation to each other. The device includes a position signal generator that generates at least one pair of position-dependent incremental scanning signals, which have a defined phase offset from each other and represent a position between two objects. A transformation table to which at least one of the at least one pair of position-dependent incremental scanning signals is passed, wherein one or several output signal values with respect to each of the at least one pair of position-dependent incremental scanning signals are stored in the transformation table, wherein the transformation table is dynamically updated in the course of determining the position between the two objects. An evaluation unit that receives the one or several output signals and determines the position between the two objects based on said one or several output signal values.

In accordance with the present invention it is now provided to embody the transformation table used for transforming the scanning signals so that it can dynamically updated. In this way a small processing outlay during the actual transformation, as well as a small outlay for memory for the transformation table, are required.

Depending on the embodiment of the transformation table which can be dynamically updated, a first transformation table, or at least a first portion of a transformation table, is used for the actual transformation operation, while at the same time a second transformation table, or a second portion of a transformation table, is being updated in the background.

The most varied transformation operations are considered within the scope of the present invention. Typical transformation operations are, for example, a signal interpolation and/or a signal correction taking place, etc. As mentioned above, the signal interpolation is understood to be a coordinate transformation from Cartesian coordinates to polar coordinates.

In principle, several such transformation tables can be used in cascaded arrangements, wherein each one of the individual transformation tables takes on a defined transformation operation. However, alternatively to this it is also possible to provide only a single transformation table, in which different transformation operations are simultaneously performed, for example the simultaneous signal interpolation and signal correction, etc.

The measures in accordance with the present invention can be employed in connection with incremental position measuring systems with physically embodied scale graduations, as well as with laser interferometers.

Furthermore, linear position measuring systems, as well as rotary position measuring systems, can be embodied in accordance with the present invention.

Further advantages, as well as details of the present invention ensue from the subsequent description of exemplary embodiments, making reference to the attached drawings.

DETAILED DESCRIPTION OF THE PREFERRED EMBODIMENTS

Figure 1:
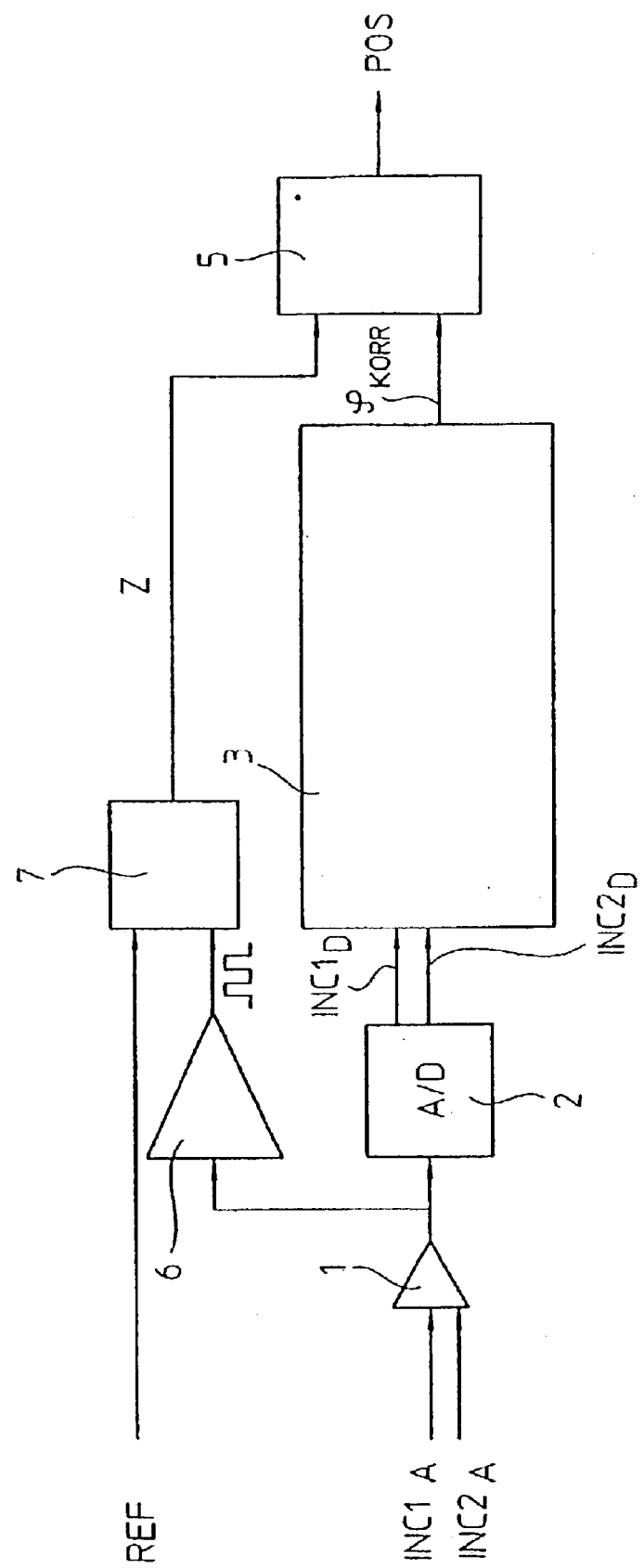
FIG. 1 is a greatly schematized block circuit diagram of an exemplary embodiment of a device for incremental position determination in accordance with the present invention.

A block circuit diagram of an exemplary embodiment of the device in accordance with the present invention, which is used for determining the position of two objects which are movable with respect to each other, is represented in FIG. 1 in a schematic form. The two objects can be, for example, a tool and a workpiece in a numerically controlled machine tool. Suitable devices for generating position-dependent incremental scanning signals $INC1_A$, $INC2_A$, which have a defined phase offset with respect to each other, are connected with the two movable objects. The phase offset is customarily 90°. As a rule, the generated scanning signals $INC1_A$, $INC2_A$ are here sinusoidal analog signals.

Depending on the embodiment of the device in accordance with the present invention, the generation of the scanning signals $INC1_A$, $INC2_A$ can take place in different ways. In a first category of position measuring systems the scanning of a physically embodied scale by a scanning unit is possible, wherein the scale and the scanning unit are connected with objects which are movable with respect to each other. Here, too, the most varied physical scanning principles can be employed for scanning a scale, for example photo-electrical, magnetic, inductive or capacitive scanning principles.

A second category of corresponding position measuring systems for the generation of the position-dependent scanning signals $INC1_A$, $INC2_A$ can be embodied as an interferometer, for example. Here, a measuring reflector connected with one of the two objects moves in relation to a fixed reference. In this case the respective air wavelength functions as the measuring standard.

Therefore, besides the two scanning signals $INC1_A$, $INC2_A$, the generation of a reference pulse signal REF is provided at a defined location along the respective measurement track in the example of FIG. 1. An absolute relation can be produced in the course of the position measurement in a known manner by the reference pulse signal REF. The generation of a reference pulse signal REF has no further significance for the present invention.

In the example of FIG. 1, after amplification by an amplifier unit 1 in a first processing branch, the incremental scanning signals $INC1_A$, $INC2_A$ are supplied to an A/D converter unit 2. Processing of the incremental scanning signals $INC1_A$, $INC2_A$ in accordance with the present invention, which will be explained in what follows, takes place in the first processing branch in the lower part of FIG. 1. The analog scanning signals $INC1_A$, $INC2_A$ present there are first converted into digitized scanning signals $INC1_D$, $INC2_D$ by the A/D converter unit. In this processing branch, the digitized scanning signals $INC1_D$, $INC2_D$ are fed as pairs of defined input signal values to a transformation table 3. In the transformation table 3 one or several output signal values $\phi_{KORR}$ are assigned to each pair of input signal values $INC1_D$, $INC2_D$ present there, depending on the type of the transformation operation to be performed.

In the present example it is intended to provide not only an interpolation of the scanning signals $INC1_A$, $INC2_A$ as a transformation operation, but also their correction in regard to amplitude and offset errors. The output signal value $\phi_{KORR}$ in the form of a corrected position value within a signal period of the scanning signals $INC1_A$, $INC2_A$ provided is available at the output of the transformation table 3.

The transformation table is only schematically indicated in FIG. 1. Regarding possible embodiments, reference is made to the further description of FIGS. 2 and 3. In connection with the transformation table used it should only be mentioned here that it is preferably arranged in a suitable memory module and in accordance with the present invention is embodied so that it can be dynamically updated. This is understood to mean that a preset transformation table is available for the just performed transformation operations, while the transformation table is updated in the background. The updated transformation table is activated at a later time and used for the transformation operations to be performed.

The most varied data can be used within the scope of the present invention for updating the transformation table in the background. For example, in case of a desired signal correction as the transformation operation it can be provided to use the signal values present at the input or output of the transformation table and to make them the basis of a suitable updating algorithm. However, alternatively to this it is also possible to employ further external measurement data for updating the transformation table, which have been obtained by measurements prior to and/or during the position measuring operation.

Figure 2:
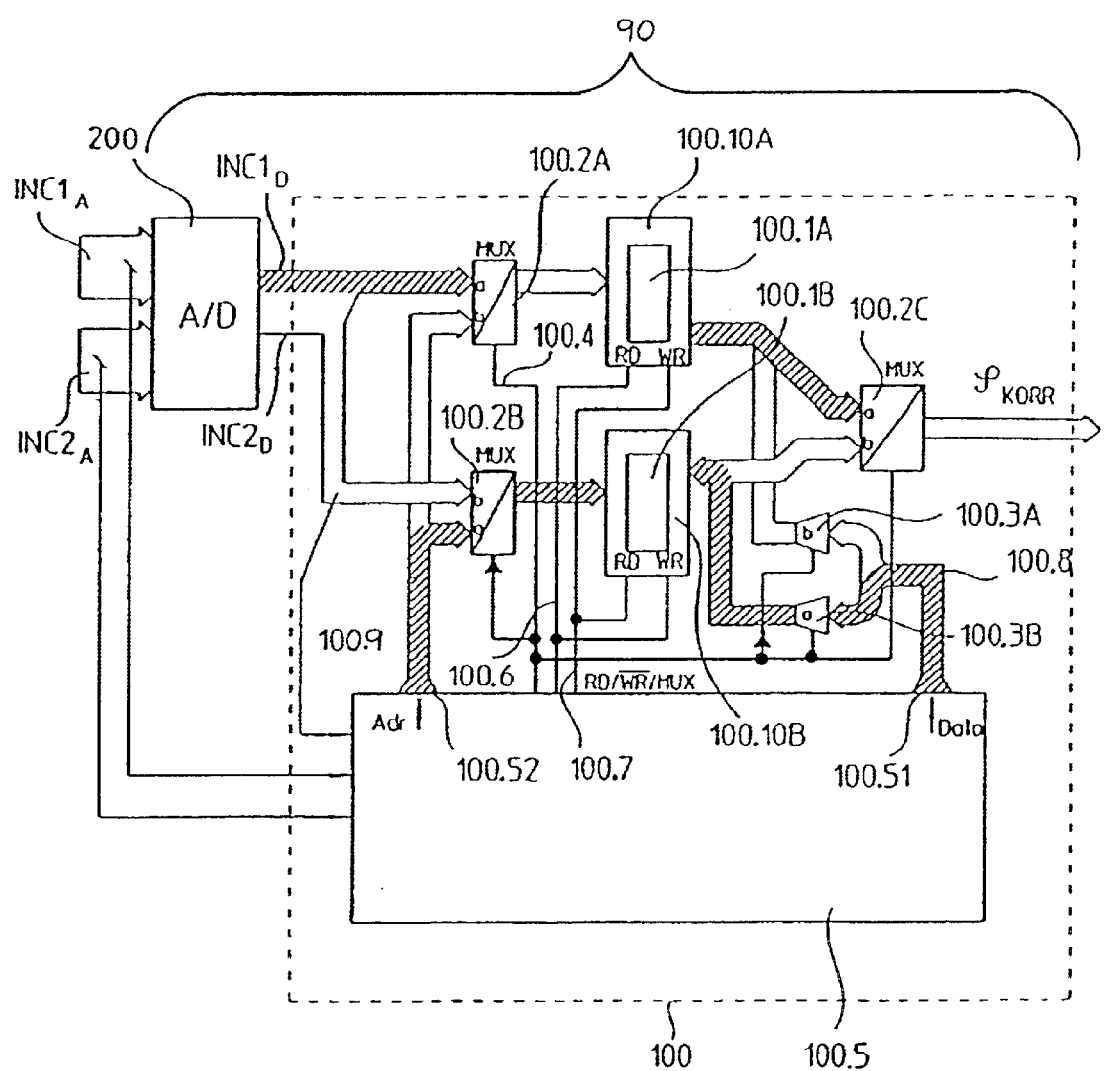
FIG. 2 is a detailed block circuit diagram of a portion of an embodiment of transformation device to be used with the device of FIG. 1 in accordance with the present invention.
Figure 3:
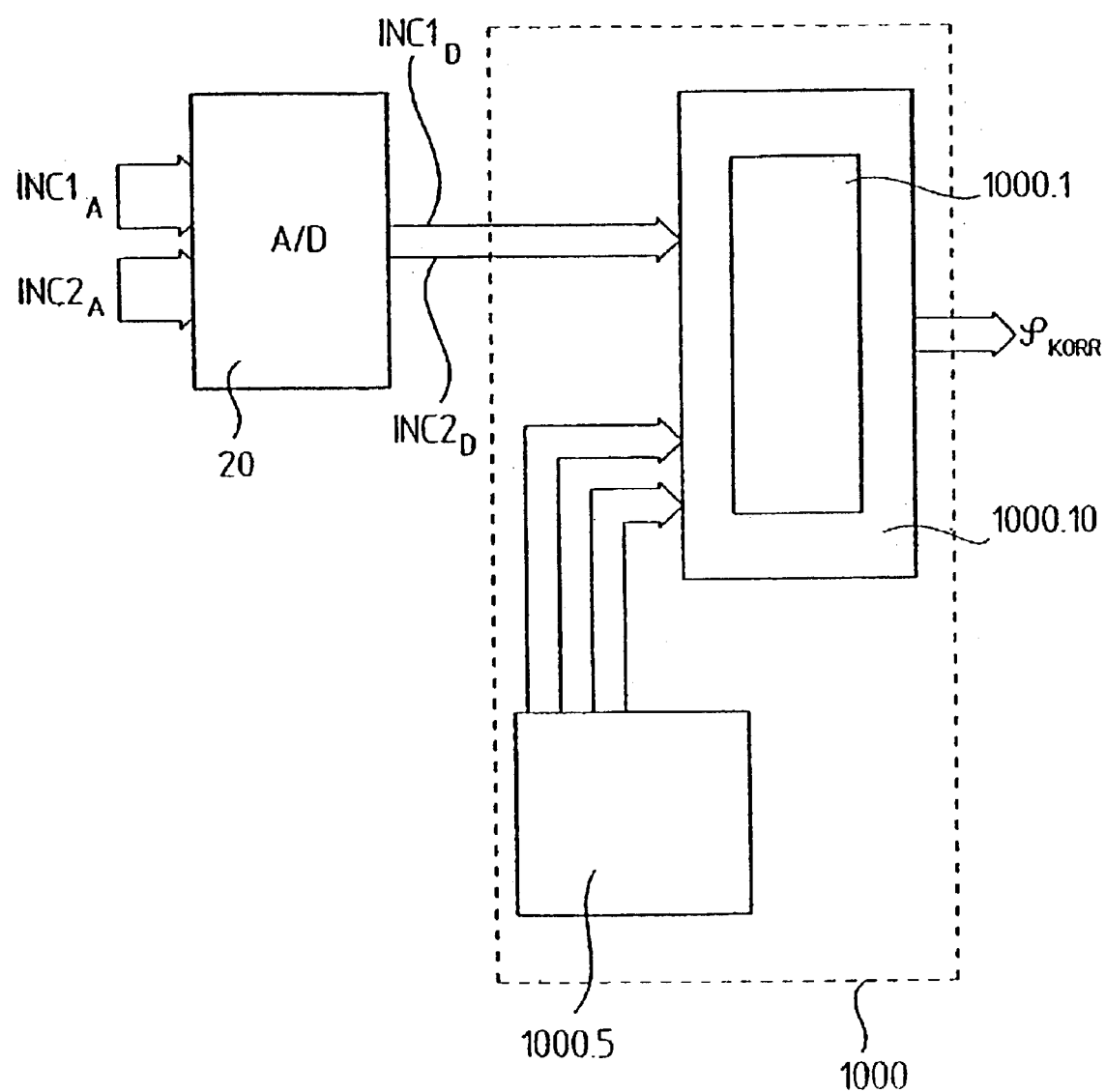
FIG. 3 is a detailed block circuit diagram of a portion of a second embodiment of a transformation device to be used with the device of FIG. 1 in accordance with the present invention.

Reference is made to the subsequent description of FIGS. 2 and 3 in regard to the actual realization of a transformation table which can be dynamically updated.

The explained exemplary embodiment moreover contains, besides the described first processing branch for the incremental scanning signals, a second processing branch, represented in the upper portion of FIG. 1. The amplified analog scanning signals $INC1_A$, $INC2_A$ are first fed into a comparator 6 in the second processing branch, by which rectangular signals are formed from the analog scanning signals $INC1_A$, $INC2_A$, which are subsequently supplied to a counter 7. Furthermore, the already mentioned reference pulse signal REF is present at the input of the counter 7 in the second processing branch. It is therefore possible via the counter 7 to determine during the position measurement the absolute relationship with respect to a known reference position with an accuracy which customarily amounts to a quarter of the signal period of the generated analog scanning signals $INC1_A$, $INC2_A$. Following the establishment of the reference relationship at a reference position, a defined counter value Z is present at the output of the counter 7, which is passed on to the position determination unit 5 for further processing, the same as the output signal value $\phi_{KORR}$ of the transformation table 3. In a known manner, the position determination unit 5 combines the passed-on data Z, $\phi_{KORR}$ in such a way that an absolute position signal POS is available for further processing at the output side. For example, it can be provided here to transmit the position signal POS in a serial form to a numerical machine tool control for further processing.

Because of the use of the transformation table 3 for signal interpolation, as well as for the signal correction taking place simultaneously, rapid signal processing in particular is assured at this place. In this way time-critical measurement tasks can also be performed.

Exemplary embodiments of the transformation table 3 will be explained in detail by the two FIGS. 2 and 3.

Here, FIG. 2 shows a first option for embodying a transformation table which can be dynamically updated via a transformation device 90 that includes a transformation unit 100 and converter unit 200. A transformation unit 100 is now provided for the actual realization of a transformation table which can be dynamically updated, at whose input the input signal values $INC1_D$, $INC2_D$, which were digitized by the A/D converter unit 200, are present. An output signal value $\phi_{KORR}$ results at the output and is available for further processing.

The use, or employment, of two separate transformation tables 100.1A, 100.1B, by which the dynamic updating of the presently active, or used transformation table takes place in the manner explained in what follows, is of decisive importance for the present exemplary embodiment. The two transformation tables 100.1A, 100.1B are preferably stored in suitable memories in the form of RAM modules 100.10A, 100.10B. For dynamic updating it is now provided that during the measuring operation always one of the two transformation tables 100.1A, 100.1B is used for the continuous transformation of the existing pairs of input signals $INC1_D$, $INC2_D$, while at the same time the other transformation table 100.1A, 100.1B is updated by an updating unit 100.5. To this end, new allocation specifications for pairs of input signals $INC1_D$, $INC2_D$ and the output signal value $\phi_{KORR}$ assigned to them are written into the respectively other transformation table. Preferably the updating unit 100.5 is embodied as a microcontroller.

In the represented example, the transformation table 100.1A is being used for the transformation of the existing input signal values $INC1_D$, $INC2_D$, while updated corrected data are simultaneously written into the other transformation table 100.1B. The signal paths of this operating mode "a" are marked by hatched lines in FIG. 2.

At the completion of the updating of the transformation table 100.1B it is subsequently used for transforming the existing input signal values $INC1_D$, $INC2_D$, while simultaneously the other transformation table 100.1A is then updated by the updating unit 100.5.

It is possible by this action to update the transformation table 100.1A, 100.1B dynamically in the course of the position measurement. In contrast to the use of fixed preset transformation tables it is possible in this way to also take error effects on the scanning signals into consideration which vary in the course of the measurement. In the case of the use of an interferometer for position measuring these could possibly be varying conditions in the vicinity requiring a flexible correction during position measuring. At the same time it is possible to assure a rapid processing of the signals, as well as a not too extensive memory volume for the transformation tables.

The transformation device 100 represented in FIG. 2 includes, beside the already explained basic components, two multiplexers 100.2A, 100.2B, which are arranged upstream of the two transformation tables 100.1A, 100.1B, which sequentially pass on the data present at the input to the transformation tables 100.1A, 100.1B, or the corresponding memory modules 100.10A, 100.10B. Furthermore, a third multiplexer 100.2C is arranged downstream of the two transformation tables 100.1A, 100.1B, which selects the output value of the transformation table 100.1A, which is not being considered for updating at that time, and switches it as the transformed output signal value $\phi$KORR to a data output bus for further processing.

For switching between the transformation tables 100.1A, 100.1B, the various multiplexers 100.2A, 100.2B, 100.2C are controlled by the updating unit 100.5 via appropriate multiplexer control lines 100.4. In the present case of the operating mode "a" and the use of the transformation table 100.1A, it is therefore necessary to activate the appropriately hatched signal path via the multiplexer control line 100.4. As can be seen in the drawing, part of this is also the simultaneous connection of the updating unit 100.5 with the transformation table 100.1B which is in the process of being updated.

Each of the two upstream-connected multiplexers 100.2A, 100.2B has, besides the respective input for the input signal values, also an address input, which is connected via the addressing bus 100.9 with the address output 100.52 of the updating unit 100.5 in order to make it possible in the course of writing on the memory modules 100.10A, 100.10B to address them with fresh transformation data.

The transformation device 100 of the example represented in FIG. 2 further includes read-and-write control lines 100.6, 100.7, by which the read-in and read-out of the memories 100.10A, 100.10B is chronologically synchronized in a suitable manner by the updating unit 100.5.

Furthermore, a data output 100.51 on the part of the updating unit 100.5 is represented in FIG. 2, through which the respective updated transformation data are transmitted in the direction of the transformation table 100.1A, 100.1B which is respectively to be updated. Depending on which one of the two transformation tables 100.1A, 100.1B is to be updated at that time, the transmission of transformation data takes place via the data output 100.51 and the downstream connected transformation data lines 100.8. Driver modules 100.3A, 100.3B are arranged in the respective transformation data lines 100.8 and are also connected via the multiplexer control lines 100.4 with the updating unit 100.5, which in this location provides the chronologically correct switching of the transformation data lines 100.8 to the respectively correct transformation table 100.1A, 100.1B.

A second exemplary embodiment of a suitable transformation device, in particular a further possibility for the dynamic updating of the transformation table will be explained by the greatly schematized representation in FIG. 3.

In this embodiment, the transformation device 1000 connected downstream of the A/D converter unit 200 only includes a single memory 1000.10 in the form of a so-called dual-ported RAM, or dual-ported memory, in which the transformation table used 1000.1 is stored. It is therefore possible with the aid of dual-ported RAMs to assure that the read-in of input signal values $INC1_D$, $INC2_D$ and the output of transformed output signal values $\phi_{KORR}$ on the one hand, and on the other hand the updating of the transformation table 1000.1 by appropriate synchronized read and write pickups from the updating unit 1000.5, take place independently of each other. Thus, such a memory 1000.10 can be used for correcting the available input signal values $INC1_D$, $INC2_D$ and for the output of transformed output signal values $\phi_{KORR}$, while simultaneously the transformation table 1000.1 is updated by the updating unit 1000.5.

Because of the use of the dual-port RAM and its capabilities for the simultaneous reading-in and reading-out, a reduced synchronization outlay as a whole results in comparison with the employment of two physically separated memories as in the example in FIG. 2.

Thus, various options for the actual design of the transformation device, or transformation table, exist within the scope of the present invention, in particular for assuring their ability for dynamic updating.

Within the scope of the present invention, further embodiment variations of course also exist besides the explained example.

We claim:

1. A method for the incremental position determination of two objects, which are movable in relation to each other, the method comprising:

generating at least one pair of position-dependent incremental scanning signals during a position determination between two objects, which have a defined phase offset from each other;

passing said at least one pair of position-dependent incremental scanning signals on to a transformation table in which one or several output signal values with respect to each pair of said at least one pair of position-dependent incremental scanning signals have been stored;

transferring said one or several output signals from said transformation cable to an evaluation unit wherein position determination between said two objects is performed; and dynamically updating said transformation table during said position determination between said two objects.

2. The method in accordance with claim 1, wherein only a single transformation table is provided and is used for transforming said at least one pair of position-dependent incremental scanning signals, while said transformation table undergoes said dynamically updating.

3. The method in accordance with claim 2, wherein said transformation table is stored in a dual-ported random access memory, which is used for transforming said at least one pair of position-dependent incremental scanning signals, while said transformation table undergoes said dynamically updating.

4. The method in accordance with claim 1, further comprising a second transformation table, wherein said method further comprises:

continuously transforming said at least one pair of position-dependent incremental scanning signals at said transformation table; and updating said second transformation table during said continuously transforming.

5. The method in accordance with claim 4, using said updated second transformation table during said continuously transforming said at least one pair of position-dependent incremental scanning signals; and updating said transformation table.

6. The method in accordance with claim 5, wherein only one of said transformation table and said second transformation table is connected with said evaluation unit which is just being used for said continuously transforming.

7. The method in accordance with claim 1, further comprising performing a transformation operation by said transformation table by interpolating said at least one pair of position-dependent incremental scanning signals.

8. The method in accordance with claim 1, further comprising performing a transformation operation by said transformation table by correcting said at least one pair of position-dependent incremental scanning signals with respect to possible offset and/or amplitude errors.

9. The method in accordance with claim 7, wherein said performing said transformation operation further comprises correcting said at least one pair of position-dependent incremental scanning signals with respect to possible offset and/or amplitude errors.

10. The method in accordance with claim 1, wherein said at least one pair of position-dependent incremental scanning signals are used for said dynamically updating said transformation table.

11. The method in accordance with claim 1, wherein further external measured data, which have been obtained by measurements prior to and/or during said position measuring, are used for said dynamically updating said transformation table.

12. A device for the incremental position determination of two objects, which are movable in relation to each other, the device comprising:

a position signal generator that generates at least one pair of position-dependent incremental scanning signals, which have a defined phase offset from each other and represent a position between two objects;

a transformation table to which at least one of said at least one pair of position-dependent incremental scanning signals is passed, wherein one or several output signal values with respect to each of said at least one pair of position-dependent incremental scanning signals are stored in said transformation table, wherein said transformation table is dynamically updated in the course of determining said position between said two objects; and an evaluation unit that receives said one or several output signals and determines said position between said two objects based on said one or several output signal values.

13. The device in accordance with claim 12, wherein said transformation table consists essentially of a single transformation table, which is used for transforming said at least one pair of position-dependent incremental scanning signals, while said transformation table is simultaneously updated.

14. The device in accordance with claim 13, further comprising a dual-ported random access memory that stores said transformation table, which is used for transforming said at least one pair of position-dependent incremental scanning signals, while said transformation table is simultaneously updated.

15. The device in accordance with claim 12, further comprising a second transformation table, wherein said transformation table is used for continuous correction of said at least one pair of position-dependent incremental scanning signals, while said second transformation table is simultaneously updated.

16. The device in accordance with claim 15, further comprising a microcontroller used for continuous correction of said at least one pair of position-dependent incremental scanning signals, said microcontroller activates said updated second transformation table while said transformation table is simultaneously updated.

17. The device in accordance with claim 16, wherein only one of said transformation table and said second transformation table is connected with said evaluation unit which is just being used for said continuously transforming.

18. The device in accordance with claim 12, further comprising at least one A/D converter unit connected upstream of said transformation table, said at least one A/D converter unit, by which said at least one pair of position-dependent incremental scanning signals are digitized.

19. A method for the incremental position determination of two objects, which are movable in relation to each other, the method comprising:

generating at least one pair of position-dependent incremental scanning signals during a position determination between two objects, which have a defined phase offset from each other;

passing said at least one pair of position-dependent incremental scanning signals on to a transformation table in which one or several output signal values with respect to each pair of said at least one pair of position-dependent incremental scanning signals have been stored;

transferring said one or several output signals from said transformation table to an evaluation unit wherein position determination between said two objects is performed; and dynamically updating said transformation table by synchronizing reading in and reading out of update data during said position determination between said two objects.

20. The method in accordance with claim 19, wherein only a single transformation table is provided and is used for transforming said at least one pair of position-dependent incremental scanning signals, while said transformation table undergoes said dynamically updating.

21. The method in accordance with claim 20, wherein said transformation table is stored in a dual-ported random access memory, which is used for transforming said at least one pair of position-dependent incremental scanning signals, while said transformation table undergoes said dynamically updating.

22. The method in accordance with claim 19, further comprising a second transformation table, wherein said method further comprises:

continuously transforming said at least one pair of position-dependent incremental scanning signals at said transformation table; and updating said second transformation table during said continuously transforming.

23. The method in accordance with claim 22, using said updated second transformation table during said continuously transforming said at least ore pair of position-dependent incremental scanning signals; and updating said transformation table.

24. The method in accordance with claim 23, wherein only one of said transformation table and said second transformation table is connected with said evaluation unit which is just being used for said continuously transforming.

25. The method in accordance with claim 19, further comprising performing a transformation operation by said transformation table by interpolating said at least one pair of position-dependent incremental scanning signals.

26. The method in accordance with claim 19, further comprising performing a transformation operation by said transformation table by correcting said at least one pair of position-dependent incremental scanning signals with respect to possible offset and/or amplitude errors.

27. The method in accordance with claim 25, wherein said performing said transformation operation further comprises correcting said at least one pair of position-dependent incremental scanning signals with respect to possible offset and/or amplitude errors.

28. The method in accordance with claim 19, wherein said at least one pair of position-dependent incremental scanning signals are used for said dynamically updating said transformation table.

29. The method in accordance with claim 19, wherein further external measured data, which have been obtained by measurements prior to and/or during said position measuring, are used for said dynamically updating said transformation table.

* * * * *